Nov. 14, 1967    C. BEAU ET AL    3,352,437
GARAGE FOR MOTOR VEHICLES
Filed June 14, 1965    2 Sheets-Sheet 1
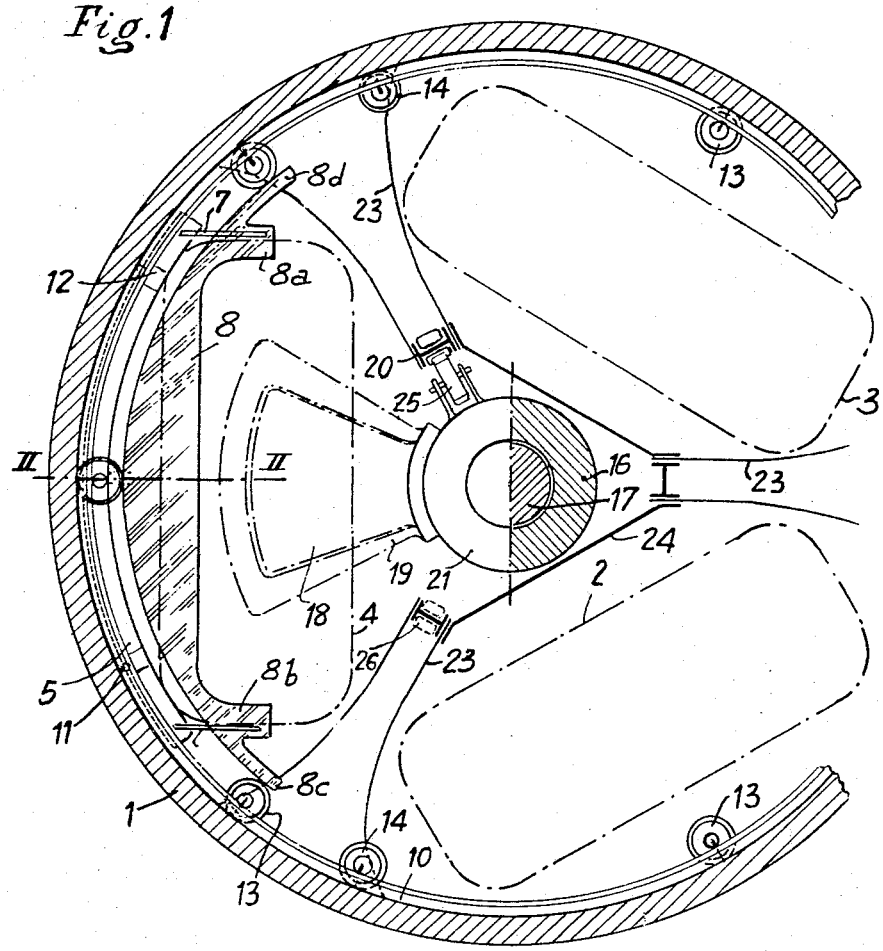
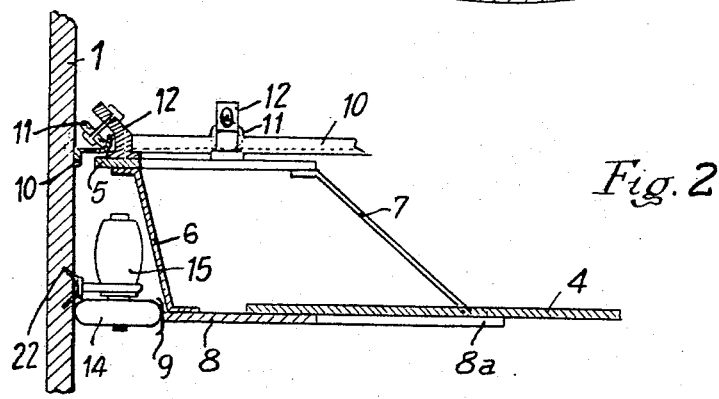
INVENTORS
CHRISTIAN BEAU
GERARD BEAU
By Young + Thompson
ATTYS.

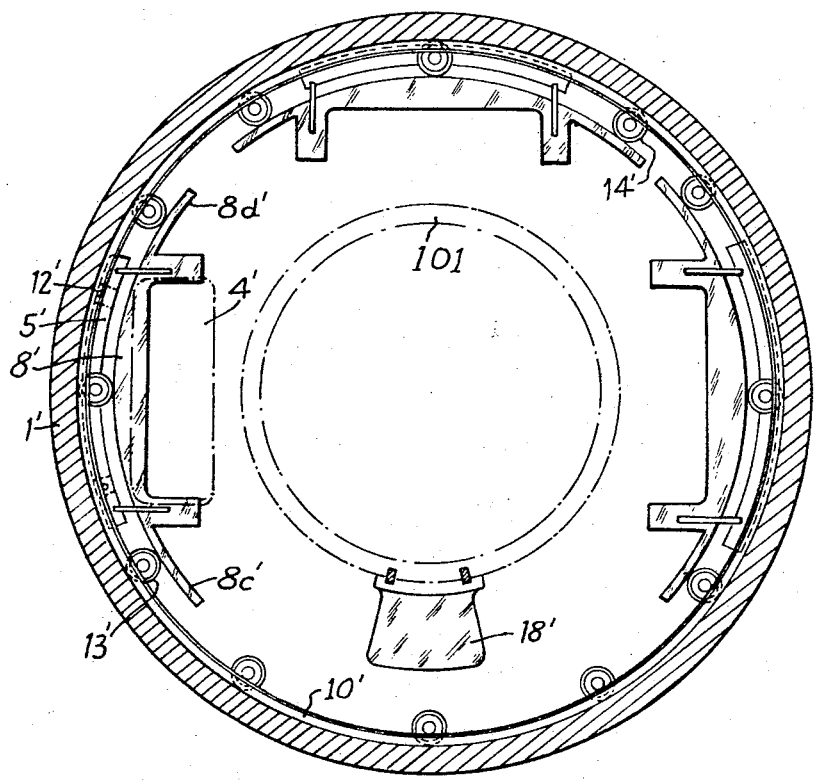

United States Patent Office 3,352,437
Patented Nov. 14, 1967

3,352,437
GARAGE FOR MOTOR VEHICLES
Christian Beau, 31 Rue de Louvois, Chaville, Seine-et-Oise, France, and Gerard Beau, 17 Rue de l'Ancienne Comedie, Paris 6, Seine, France
Filed June 14, 1965, Ser. No. 463,620
Claims priority, application France, June 16, 1964, 978,371, Patent 1,429,273
7 Claims. (Cl. 214—16.1)

ABSTRACT OF THE DISCLOSURE

A parking garage comprises a cylindrical outer wall having a central elevator vertically movable between a plurality of levels. At each level, a circular trackway on the wall of the garage supports a plurality of vehicle-supporting brackets that can roll about the garage between loading and unloading and storage positions.

The invention relates to a garage for motor vehicles which is of the vertical type and preferably underground. The object of this invention is to provide a unit capable of storing the greatest possible number of vehicles in a given floor space, with the maximum facility of access for parking and removing of the vehicles.

In a first form of the invention, the enclosing wall, which may be either a shaft or a tower of circular section, carries a regularly spaced arrangement of brackets forming supports for movable vehicle-carrying platforms at equidistant levels in such a way that at each level, with the platforms in their parking position, the longitudinal axes of the platforms form two sides of an equilateral or right-angled triangle, the third side of the triangle, at each level, remaining unencumbered in the axis of a vertical cage that permits the passage of a vertical handling, i.e. raising and lowering, device that is capable of moving through the entire height of the shaft. An opening or passageway made in the enclosing wall at any given level permits a vehicle to be loaded onto the free platform which has been brought in front of the aperture by a bracket. The movable platforms are of known type, a space being left between them and their supports so as to permit the introduction of forks that are carried by the handling means. These forks are thus fixed to the vertical handling means. The movable platforms are, of course, channeled to permit the passage, at the vertical handling position, of the said handling means and, in particular, of its forks.

The mode of operation of the garage is as follows:

A bracket bearing an empty movable platform is brought in front of the loading and unloading aperture of the enclosing wall of the garage. The vehicle to be parked is then pushed onto that platform. Next, the vertical handling means takes the platform, together with the vehicle loaded on it, onto its forks and hoists it to a position slightly above the selected parking level. An empty bracket is then brought to the "berth" located in the path of travel of the vertical handling means, whereupon the latter deposits the movable platform and the loaded vehicle onto that bracket.

Finally, the bracket is returned laterally to a parking or storing position, thereby freeing the vertical travel cage of the vertical handling means, which again becomes available for another vehicle handling operation. The reverse procedure is followed in order to remove a vehicle from the garage.

To the enclosing wall so formed there may be added a second, externally concentric annular enclosing wall comprising, for example, at each level, five mobile brackets forming supports for movable vehicle-carrying platforms, these platforms being arranged approximately tangentially to the external surface of the party wall separating the two enclosing walls in the same shaft, with a free vertical passage for the travel of the handling device allocated to this enclosing wall. A third and possibly a fourth annular enclosing wall similar to the second one may be provided, depending on the space available. The garage may, of course, be limited to one such enclosing wall only, if appropriate.

In accordance with another characteristic of the invention, the brackets intended to support the movable platforms at each parking level within the internal enclosing wall are themselves mobile; these brackets can be shifted by rotation around the axis of the shaft from their normal parking position to a free vertical passage where the hoisting device deposits or withdraws the platforms, which may be either loaded or empty; conversely, the brackets may be shifted from their free vertical passage into their parking position.

In the case of a second or third enclosing wall concentric with the first, the set of brackets is preferably made solid by any suitable means and the train of movable platforms, whether or not loaded with vehicles, is able to be shifted by rotation of up to 360° to the vertical passage to permit the removal of the desired platform.

If the hoisting device is provided with means of vertical travel only, the movement of each bracket, which, in the case of the internal enclosing wall, is through an angle of rotation of 120° or 135°, can be brought about by any form of drive, such as friction rollers driven by a motor fixed to the wall or party-wall of the shaft, a cable, an endless chain articulated in one or two planes, a rack or other means, or by a motor fixed with the bracket.

If the hoisting device is provided not only with means of vertical travel permitting it to reach a given level but also with means of rotation at each level, the hoisting device will itself be able to place the bracket into its parking or stationary position or into the hoisting position by simply pushing it or by pulling it.

Advantageously, each double bracket can be formed by a three-point bearing surface capable of receiving the vehicle-carrying platform, the said surface being equipped with means of engaging onto and rolling along a profiled circular rail, together with other means of support to absorb the horizontal reaction of the load and with driving means to provide for the rotation of the rack.

The utilization of the various forms of the garage is similar to that described above.

Other characteristics will appear from the following description, which relates to a form of construction of the invention that is offered by way of example only.

In the annexed drawings:

FIGURE 1 is a plan view of one level of a garage with a single enclosing wall, corresponding to a cross section of the shaft at a given level.

FIGURE 2 is a sectional view taken on line II—II of FIGURE 1, on an enlarged scale.

FIGURE 3 is a view similar to FIG. 1 but showing a modified form of the invention.

The shaft 1, which is circular in section, can be sunk to the desired depth depending on the number of vehicles to be parked. The wall can be concreted; it can also be formed by a metal shaft lining composed of juxtaposed and assembled components. Two platforms 2 and 3 are represented by dot-and-dash lines in their parking or storing position at a given level. The shaft can thus comprise $n$ levels, each level having two platforms, the longitudinal axes of which form an angle of 60°. The base of the triangle so formed is unencumbered and forms the cage for the travel of the vertical handling device.

Each vehicle-carrying platform rests on a mobile bracket. There are thus two mobile brackets at each level. A single bracket, occupying the platform-handling position, is represented in FIGURE 1. A mobile bracket is formed, for example, by an iron plate 5 in the form of a segment of a circle, to which is fixed by means of inclined braces, angle-irons or any girdering system 6–7, a supporting surface 8 having a recess 8a–8b on which may rest a movable platform 4, represented in dot-and-dash lines. The external profile of the bearing or supporting surface is similarly in the form of a segment of a circle, with prolongations 8c, 8d, the purpose of which will be explained later.

Support bearings 12, generally three or four in number, are secured to the iron plate 5 to carry the spindles of rollers 11 inclined at 45°. The circular rail 10 is continuous at each level of the shaft. Thus, the bearing or supporting surface 8 is carried by the rollers 11 on the rail 10, on which it can travel by means of the rollers, describing an arc of 120° from position 4 (vertical handling position) to position 2 or 3 (parking position). Wheels 13 turning freely on supports 22 anchored in the wall are mounted at right angles to and in the plane of the bearing surface. These wheels roll on a rail 9, which is in the form of a segment of a circle and is carried by the bracket. A wheel 14 is mounted like wheels 13 but is a driving wheel, powered by a motor 15 fixed to the wall of the shaft, the rotation travel of the bracket being brought about by the driving wheel and the friction with the roller-rail. When the angle of rotation of the bracket attains a certain value, the segment 8d of the bearing surface, during the course of the angular displacement from position 4 to position 2, leaves one wheel 13 but the opposite end 8c engages the following wheel, thus ensuring continuous angular displacement of the bracket. The driving wheels are so positioned that a bracket leaving one driving wheel is driven by the following driving wheel, the motors being synchronized.

It will be clear that this form of construction of the invention is by way of example only and that many other forms of construction would yield the same result.

For example, the supporting surface 8 which is suspended from the iron bearing plate 5, equipped with rollers that travel on the profiled circular rail 10, could be in the upper part and the iron plate in the lower part; in that case, the bearings 12 would be fixed to the supporting surface and rollers 13 and 14 would be placed in the plane of the iron plate 5. Instead of being secured to the wall of the shaft, the motor could be attached to the bracket. The driving of a bracket could be provided by a single motor driving cables rolling along the wall in either direction, or equally well by a rack fixed to the bracket and a pinion carried by the wall or else by a rack secured to the wall and a driving pinion carried by the bracket.

When the platforms 2 and 3 are placed in their respective locations in such a way that their longitudinal axes are mutually perpendicular the brackets forming support surfaces may be arranged in two groups according to two different vertical lines and are staggered so that the level of the surfaces of one group is at a height between two consecutive levels of the other group, thereby enabling space to be saved vertically through intercalation of the less high parts of the parked vehicles, one above the other.

The hoisting or elevator device can be formed by a nut 16 resting on the thread of a screw 17 placed in the axis of the shaft, the nut carrying a fork 18 on which is placed a vehicle-carrying platform 2 or 3.

Advantageously, two hoisting devices may be placed in the same shaft with a common axis, the lower fork being allocated to the raising and the upper fork to the lowering of the vehicles. Colliding of the two hoists is avoided by means of reversing contacts mounted on a long-travel telescopic push-rod. In the case of two screws each supporting a handling fork, an upper fork 18 and a lower fork 19, the lower fork is so profiled that its surface can reach the same level as the upper fork.

In a modification represented in FIGURE 1, a sleeve 21, or two similar sleeves if there are two hoists, are able to slide on a smooth central tube of welded or cast steel formed by encased elements concreted internally. Three vertical channel-iron posts 20 are mounted at the corners of an open triangle in front of the vertical handling passage to permit the fork or forks 18, 19 to pass. These vertical posts are supported by horizontal iron beams 23 anchored in the wall and angle-brackets 24 placed between two consecutive levels. The fork-carrying sleeves are driven by racks, finned chains, suspended chains secured at the tops of the posts or endless noria chains with upper and lower wheels and tension device. A driving pinion or sprocket 25 can engage in the links of said chains 26. Each post supports a noria chain and the movement of the three chains must be synchronized.

It is advantageous to provide for the different displacements of the mobile elements, that is to say, for the elevator and for the brackets a drive at two speeds so that the elevator or hoist may travel up or down fast when empty and slow when loaded, and that the angular displacement of the mobile brackets may be accelerated when unloaded and slowed when loaded.

In operation, the fork of the vertical handling device must be brought opposite the free vertical passage before the bracket is brought into place at the same point, and the level of the fork positioned slightly below the platform mounted on the bearing surface. The bracket is returned to its parking position as soon as the elevator or hoisting device has driven the platform to the desired position to permit the free passage of the latter.

FIG. 3 shows a modification of the invention, in which the same parts bear the same reference numerals but with the addition of primes. In the embodiment of FIG. 3, the outer wall 1' is the same as in FIG. 1 but larger, and the individual brackets and their mountings are the same as in FIG. 1, but there are more of them. In order to accommodate this increased number of brackets, therefore, the elevator with its fork 18' is supported by an internal cylindrical wall 101 of a suitable diameter. FIG. 3 thus illustrates the fact that the number of brackets can be varied as desired.

It will be clear that many constructional modifications are possible of the device as described and represented, without departing from the scope of the present invention.

Having described our invention, we claim:

1. In a multi-level motor-vehicle parking garage comprising an external enclosing wall with, at each level, brackets rotatable about a vertical axis and movable platforms to be handled by means of forks and to receive vehicles and to be placed on the said brackets and a horizontal passage at one level for the placing of a vehicle on to a movable platform, vertical handling means provided with forks to receive a movable platform and operating in the spaces that are left unencumbered at each storage level, the combination of means of rotation of the bracket at each storage level including a horizontally disposed rail of general circular form, rollers with vertical axes positioned regularly around the external enclosing wall, at the same distance from the vertical axis of the said circular rail, at least one bracket having a horizontal supporting surface to receive the mobile platforms and channeled to permit the passage of the forks of the vertical handling means, at least two revolving rollers fixed to the bracket and, supported on the circular rail, a supporting surface of the bracket rotatable about the vertical axis of the rails and, supported on the vertical-axis rollers and means for displacing the brackets on the circular rail.

2. A garage in accordance with claim 1, in which the revolving rollers fixed with the bracket have their axes set obliquely and the rail of circular general form possesses an oblique part on which the said rollers are supported and revolve.

3. A garage in accordance with claim 1, in which the circular rail at each level has dimensions corresponding to the space occupied by three brackets loaded with vehicles but is provided with only two brackets.

4. A garage in accordance with claim 1, in which the circular rail at each level has dimensions corresponding to the space occupied by any number of brackets loaded with vehicles but is provided with a number of brackets which is lower by at least 1 than the number of such spaces.

5. A garage in accordance with claim 1, in which, at each level, each bracket is independent of its neighboring brackets.

6. A garage in accordance with claim 1, in which, at each level, at least one vertical-axis roller is equipped with means for providing rotational drive, such as an electric motor.

7. A garage in accordance with claim 1, in which the vertical handling means is formed by at least one sleeve sliding on a central tube, the sleeve being provided with drive pinions or sprockets engaging with chains or racks supported by vertical posts anchored in the enclosing wall of the garage.

References Cited

UNITED STATES PATENTS

| | | | |
|---|---|---|---|
| 2,849,127 | 8/1958 | Densmore | 214—16.1 |
| 3,204,785 | 9/1965 | Bajulaz | 214—16.1 |

FOREIGN PATENTS

| | | |
|---|---|---|
| 1,374,238 | 8/1964 | France. |
| 160,696 | 6/1933 | Switzerland. |

HUGO O. SCHULZ, *Primary Examiner.*

GERALD M. FORLENZA, *Examiner.*

R. B. JOHNSON, *Assistant Examiner.*